(12) United States Patent
Yokoyama et al.

(10) Patent No.: US 11,796,035 B2
(45) Date of Patent: Oct. 24, 2023

(54) V-RIBBED BELT AND METHOD FOR MANUFACTURING SAME

(71) Applicant: Mitsuboshi Belting Ltd., Kobe (JP)

(72) Inventors: Kazutaka Yokoyama, Hyogo (JP); Hiroki Takechi, Hyogo (JP); Arata Hasegawa, Hyogo (JP); Takeshi Nishiyama, Hyogo (JP); Manabu Mitsutomi, Hyogo (JP)

(73) Assignee: Mitsuboshi Belting Ltd., Kobe (JP)

( * ) Notice: Subject to any disclaimer, the term of this patent is extended or adjusted under 35 U.S.C. 154(b) by 685 days.

(21) Appl. No.: 16/624,726

(22) PCT Filed: Jun. 15, 2018

(86) PCT No.: PCT/JP2018/023040
§ 371 (c)(1),
(2) Date: Dec. 19, 2019

(87) PCT Pub. No.: WO2018/235755
PCT Pub. Date: Dec. 27, 2018

(65) Prior Publication Data
US 2021/0190176 A1    Jun. 24, 2021

(30) Foreign Application Priority Data

Jun. 20, 2017  (JP) .................................. 2017-120811
Jun. 13, 2018  (JP) .................................. 2018-112540

(51) Int. Cl.
*D02G 3/04*     (2006.01)
*D02G 1/18*     (2006.01)
(Continued)

(52) U.S. Cl.
CPC ................ *F16G 5/08* (2013.01); *B29D 29/10* (2013.01); *D02G 1/18* (2013.01); *D02G 3/04* (2013.01);
(Continued)

(58) Field of Classification Search
None
See application file for complete search history.

(56) References Cited

U.S. PATENT DOCUMENTS 4,914,902 A     4/1990  Keefe, Jr.
2003/0211911 A1  11/2003  Welk
(Continued)

FOREIGN PATENT DOCUMENTS

CN     1045611 A     9/1990
CN     1566247 A     1/2005
(Continued)

OTHER PUBLICATIONS

Machine translation of JP2010101478 (Year: 2010).*
(Continued)

*Primary Examiner* — Shawn McKinnon
(74) *Attorney, Agent, or Firm* — Banner & Witcoff, Ltd.

(57) ABSTRACT

The present invention relates to a V-ribbed belt that has a medium elongation of 0.8% or more when the load of 4 cN/dtex is applied, and that contains a twisted cord in which a high-elongation aramid fiber having a tensile modulus of 50-100 GPa and a low-modulus fiber having a lower tensile modulus than the high-elongation aramid fiber are blended and twisted.

11 Claims, 4 Drawing Sheets

(51) Int. Cl.
  *F16G 5/08* (2006.01)
  *B29D 29/10* (2006.01)
  *F16G 5/20* (2006.01)
  *D06M 15/693* (2006.01)
  *D02G 3/44* (2006.01)

(52) U.S. Cl.
  CPC .......... *D02G 3/447* (2013.01); *D06M 15/693* (2013.01); *F16G 5/20* (2013.01); *D10B 2331/021* (2013.01)

(56) References Cited

U.S. PATENT DOCUMENTS

| | | |
|---|---|---|
| 2006/0179812 A1 | 8/2006 | Clough et al. |
| 2006/0182962 A1 | 8/2006 | Bucher et al. |
| 2007/0079695 A1 | 4/2007 | Bucher et al. |
| 2007/0098985 A1 | 5/2007 | Bucher et al. |
| 2007/0243375 A1 | 10/2007 | Kohashi et al. |
| 2008/0196818 A1 | 8/2008 | Di Meco et al. |
| 2010/0101202 A1 | 4/2010 | Okumura et al. |
| 2010/0167860 A1 | 7/2010 | Mori et al. |
| 2010/0173740 A1 | 7/2010 | Mori et al. |
| 2010/0192758 A1 | 8/2010 | Clough |
| 2011/0129657 A1 | 6/2011 | Clough |
| 2012/0157251 A1 | 6/2012 | Di Meco et al. |
| 2014/0073468 A1* | 3/2014 | Knutson ................ D02G 3/44 57/17 |
| 2014/0135161 A1 | 5/2014 | Mori et al. |
| 2014/0364262 A1 | 12/2014 | Mori et al. |
| 2016/0053850 A1 | 2/2016 | Brocke et al. |
| 2016/0107485 A1 | 4/2016 | Lee et al. |
| 2016/0251785 A1 | 9/2016 | Clough |
| 2019/0276954 A1 | 9/2019 | Tomoda |

FOREIGN PATENT DOCUMENTS

| | | |
|---|---|---|
| CN | 1981083 A | 6/2007 |
| CN | 101115873 A | 1/2008 |
| CN | 101133262 A | 2/2008 |
| CN | 101622385 A | 1/2010 |
| CN | 102803787 A | 11/2012 |
| DE | 102013104757 A1 | 11/2014 |
| EP | 0360588 A2 | 3/1990 |
| JP | H02-091239 A | 3/1990 |
| JP | H05-060178 A | 3/1993 |
| JP | H08-199484 A | 8/1996 |
| JP | 2008-100365 A | 5/2008 |
| JP | 2010101478 * | 5/2010 |
| JP | 2013-127278 A | 6/2013 |
| JP | 2016-079548 A | 5/2016 |
| JP | 2018-071035 A | 5/2018 |
| TW | 200401085 A | 1/2004 |
| TW | 200936911 A | 9/2009 |
| WO | 97-06297 A1 | 2/1997 |
| WO | 2015-069989 A1 | 5/2015 |

OTHER PUBLICATIONS

Aug. 7, 2018—International Search Report—Intl App PCT/JP2018/023040.
Feb. 22, 2019—(TW) Office Action—App 107121093.
Nov. 4, 2020—(CH) Office Action—App 201880040292.8, Eng Tran.
Feng Xinde, China Petrochemical Press, Macromolecule Dictionary, p. 417 (Jun. 30, 1998), English Translation not available.
Nov. 19, 2020—(JP) Notification of Reasons for Revocation Opposition No. 2020-700553 (U.S. Pat. No. 6,640,921)—App 2018-112540.
Oct. 22, 2021—(JP) Decision on Opposition No. 2020-700553 (U.S. Pat. No. 6,640,921)—App 2018-112540.
"High Strength Aramid Fiber Twaron" (TEIJINN), undated.
"A true all-round para-aramid performer" (TEIJINN), undated.
"Report 107, High Performance Polymer Fibres, P. R. Lewis, Rapra Review Reports, Expert overviews covering the science and technology of rubber and plastics", vol. 9, No. 11, 1999, Rapra Technology Ltd.
"Bando Technical Report No. 8, Bando Technical Report", Feb. 26, 2004, Edited by R&D Center, Corporate Planning Department, Bando Chemical Industries, LTD.
Nov. 3, 2021—(EP) Office Action—App 18820034.9.
Feb. 16, 2021—(EP) Extended Search Report—App 18820034.9.
Mar. 11, 2021—(CA) Office Action—U.S. Pat. No. 3,067,179.

* cited by examiner

V-RIBBED BELT AND METHOD FOR MANUFACTURING SAME

CROSS REFERENCE TO RELATED APPLICATIONS

This is a U.S. National Phase Application under 35 U.S.C. § 371 of International Application No. PCT/JP2018/023040, filed Jun. 15, 2018, which claims priority to Japanese Application Nos. 2017-120811, filed Jun. 20, 2017 and 2018-112540, filed Jun. 13, 2018, which was published Under PCT Article 21(2), the entire contents of which are incorporated herein by reference.

TECHNICAL FIELD

The present invention relates to a V-ribbed belt including, as a core wire, a twisted cord obtained by mix-twisting aramid fibers with low-modulus fibers, and relates to a method for manufacturing the V-ribbed belt.

BACKGROUND ART

With the nowadays trend toward severer regulations regarding the fuel efficiency of motor vehicles, vehicles equipped with an idle-stop system as a measure for improving the fuel efficiency of engines are being manufactured increasingly. A belt type ISG (integrated starter generator) drive, which transmits power from the alternator via an accessory driving belt to drive the crankshaft, is spreading as a means for restarting the engine in the idle-stop state. In the belt type ISG drive, higher dynamic tension occurs in the belt than in the ordinary engine not equipped with the ISG drive. For example, in cases when the dynamic tension occurring in the belt in the engine equipped with no ISG drive is about 250 N/rib, a dynamic tension of about 350 N/rib occurs in the belt of the engine equipped with a belt type ISG drive. Because of this, V-ribbed belts for accessory driving which are for use in engines equipped with a belt type ISG drive are required to have a high tensile modulus for keeping the elongation of the belt low even in the case where high dynamic tension occurred. Core wires including low-elongation high-modulus fibers, such as aramid fibers, are hence used suitably. These V-ribbed belts are further required, because of the high dynamic tension, to have an exceedingly high level of properties regarding noiselessness and durability, and a configuration in which the rib surface (frictional power-transmission surface) is covered with cloth is suitably used.

A V-ribbed belt in which the rib surface is covered with cloth is produced usually by a mold-patterning method. In the mold-patterning method, however, a laminated body of belt-constituting materials including core wires needs to be extended in the peripheral direction and this makes application of low-elongation core wires therein difficult. Use of core wires having low elongation arouses troubles, for example, that the laminated body cannot be sufficiently extended, resulting in rib shape failures, and that the core-wire pitch (arrangement of core wires along the belt width direction) is disordered or the core wires are damaged, resulting in a decrease in the tensile strength or durability of the power-transmission belt. JP-A-2008-100365 (Patent Literature 1) discloses, as a measure against such troubles, a method for producing a power-transmission belt using a twisted cord obtained by mix-twisting aramid fibers with fibers having a relatively high intermediate elongation. According to this literature, a high-modulus power-transmission belt which not only inhibit an occurrence of core-wire pitch failures and core-wire damage even in pressure molding in the mold-patterning method, but also can be used in driving systems which undergo large fluctuations in engine load can be produced, by mix-twisting stiff aramid fibers with fibers having a relatively high intermediate elongation, such as polyester fibers or polyamide fibers.

This power-transmission belt, however, is sometimes insufficient in the elongation of the twisted cord during the belt production and in the durability of the belt, and hence improvements have been desired.

CITATION LIST

Patent Literature

Patent Literature 1: JP-A-2008-100365 (claim 1, paragraphs [0017], [0027])

SUMMARY OF THE INVENTION

Technical Problems

An object of the present invention is to provide: a V-ribbed belt which can inhibit the core wires from suffering a disorder in pitch or being damaged during production by a mold-patterning method, and which is excellent in terms of noiselessness and durability even when used in applications where high dynamic tension occur; and a method for producing the V-ribbed belt.

Solution to the Problems

The present inventors diligently made investigations to solve the problems described above, and as a result, have discovered that in cases when high-elongation aramid fibers having an intermediate elongation under a load of 4 cN/dtex of 0.8% or higher and a tensile modulus of 50-100 GPa are mix-twisted with low-modulus fibers having a lower tensile modulus than the high-elongation aramid fibers as a twisted cord used for forming the core wires of a V-ribbed belt, the V-ribbed belt can not only inhibit the core wires from suffering a disorder in pitch or being damaged during production by a mold-patterning method, but also retain noiselessness and durability even when used in applications where high dynamic tension occur. The present invention has been thus completed.

Namely, the V-ribbed belt of the present invention includes a twisted cord that is obtained by mix-twisting: a high-elongation aramid fiber having an intermediate elongation under a load of 4 cN/dtex of 0.8% or higher and a tensile modulus of 50-100 GPa; and a low-modulus fiber having a lower tensile modulus than the high-elongation aramid fiber. The tensile modulus of the low-modulus fiber may be 20 GPa or less. The proportion of the high-elongation aramid fiber may be 60-95% by mass of the twisted cord. The twisted cord may be either a twisted cord obtained by secondarily-twisting a plurality of primarily-twisted yarns or a twisted cord obtained by twisting a plurality of untwisted yarns and may have a primary-twist coefficient of 0-6 and a secondary-twist coefficient of 2-6. The twisted cord may be Lang lay cord. In the twisted cord obtained by Lang lay, a ratio of the secondary-twist coefficient to the primary-twist coefficient of the high-elongation aramid fiber may be 4-8 (in particular, 5-7) and the primary-twist coefficient of the high-elongation aramid fiber may be 1 or less. The twisted cord may be a plied cord and the primary-twist coefficient of the high-elongation aramid fiber may be 2 or higher. The V-ribbed belt of the present invention has a frictional power-transmission surface, at least a part of which may be covered with a cloth. The V-ribbed belt of the present invention may be a V-ribbed belt to be mounted on an engine equipped with a belt type ISG drive.

The present invention involves a method for producing the V-ribbed belt, the method including a core wire preparation step of subjecting the twisted cord to a bonding treatment to prepare a core wire, in which, the method includes, in the core wire preparation step, thermally stretching and fixing the twisted cord at a heat-set stretching ratio of 3% or less during a heat treatment of the bonding treatment.

Advantageous Effects of the Invention

In the present invention, since high-elongation aramid fibers having an intermediate elongation under a load of 4 cN/dtex of 0.8% or higher and a tensile modulus of 50-100 GPa are mix-twisted with low-modulus fibers having a lower tensile modulus than the high-elongation aramid fibers as a twisted cord for forming the core wires of a V-ribbed belt, not only the cores wires can be inhibited from suffering a disorder in pitch or being damaged during production by a mold-patterning method, but also noiselessness and durability can be retained even when used in applications where high dynamic tension occur.

DESCRIPTION OF EMBODIMENTS (Twisted Cord)

Figure 1:
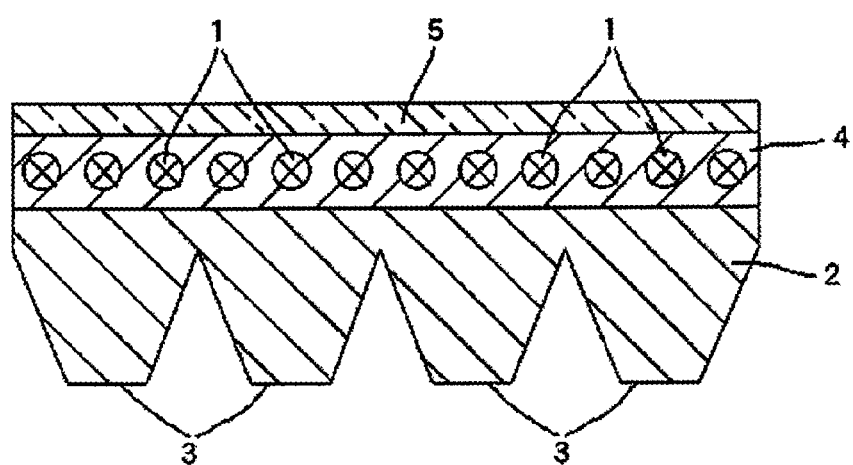
FIG. 1 is a schematic cross-sectional view illustrating one example of the V-ribbed belt of the present invention.

The V-ribbed belt of the present invention includes a twisted cord obtained by mix-twisting high-elongation aramid fibers having an intermediate elongation under a load of 4 cN/dtex of 0.8% or higher and a tensile modulus of 50-100 GPa with low-modulus fibers having a lower tensile modulus than the high-elongation aramid fibers. Since high-elongation aramid fibers having a high tensile modulus are included in the twisted cord according to the present invention, the V-ribbed belt shows excellent durability even in high-load power-transmission. Because the low-modulus fibers are included in the twisted cord and the high-elongation aramid fibers have a relatively high intermediate elongation, a laminated body of belt-constituting materials including core wires can be sufficiently extended in the peripheral direction in belt production, so that the core wires are inhibited from suffering a disorder in pitch or being damaged and hence the belt has excellent durability. The tensile modulus of the low-modulus fibers needs to be low to some degree from the standpoint of ensuring elongation, and is, for example, 20 GPa or less.

(High-Elongation Aramid Fibers)

The high-elongation aramid fibers, which are one kind of raw fibers included in the twisted cord, are required to have an intermediate elongation under a load of 4 cN/dtex of 0.8% or higher (e.g., 0.8-3%). The intermediate elongation thereof may be preferably 0.9% or higher (e.g., 0.9-2%), more preferably 1% or higher (e.g., 1-1.5%). In case where the intermediate elongation of the high-elongation aramid fibers is less than 0.8%, there is a possibility that the core wires might be damaged by the peripheral-direction extension in belt production, resulting in a decrease in durability.

In this description and the claims, an intermediate elongation means the intermediate elongation measured under a load of 4 cN/dtex, and can be measured by a method according to JIS L1017 (2002).

It is preferable that the tensile modulus of the high-elongation aramid fibers is higher, from the standpoint of inhibiting the belt from elongating during use. However, too high tensile modulus thereof tend to result in a decrease in the intermediate elongation and it is hence necessary to regulate the tensile modulus thereof to a value within an appropriate range. The range is required to be 50-100 GPa, and is preferably about 50-90 GPa (e.g., 60-90 GPa), more preferably about 60-80 GPa (e.g., 60-70 GPa).

In this description and the claims, tensile modulus can be determined by the method described in JIS L1013 (2010) in which a load-elongation curve is determined and an average inclination of a region corresponding to loads of 1,000 MPa or less is obtained.

The high-elongation aramid fibers themselves, which are to be mix-twisted with low-modulus fibers, may be either twisted yarns (primarily-twisted yarns) or untwisted yarns (fiber bundles). The primary-twist coefficient of the high-elongation aramid fibers themselves can be selected from a range of about 0-6, and is, for example, about 0.1-5, preferably about 0.3-4. In case where the primary-twist coefficient thereof is too large, there is a possibility that the twisted cord might have reduced tensile strength, that the belt might show increased elongation to cause transmission failures, or that increased heat generation might occur due to slips, resulting in a decrease in durability.

Especially in the case where the twisted cord is one obtained by Lang lay, the primary-twist coefficient of the high-elongation aramid fibers may be 3 or less (in particular, 1 or less), for example, 0.1-3, and may be preferably about 0.2-1, more preferably about 0.3-0.8 (in particular, 0.3-0.7). The Lang lay ensures bending fatigue resistance to some degree and, hence, lower primary-twist coefficient is preferred from the standpoint of inhibiting elongation.

Meanwhile, in the case where the twisted cord is a plied cord, the primary-twist coefficient of the high-elongation aramid fibers may be 1.5 or higher (in particular, 2 or higher), for example, 1.5-6, and may be preferably about 2-5.5, more preferably about 3-5 (in particular, 3.5-4.5). In the case of a configuration of the plied cord, unlike the twisted cord obtained by Lang lay which has the configuration excellent in bending fatigue resistance, it is preferable that the high-elongation aramid fibers have an increased primary-twist coefficient. Increasing the primary-twist coefficient of the high-elongation aramid fibers makes it possible to ensure bending fatigue resistance and improve the durability even in the case of a configuration of the plied cord.

In this description and the claims, each twist coefficient of primary-twist coefficient and secondary-twist coefficient can be calculated using the following equation.

$$\text{Twist coefficient} = \{(\text{number of twists(times}/m)) \times (\sqrt{\text{total fineness}(tex)})\}/960$$

The high-elongation aramid fibers to be used as raw fibers usually are para-aramid multifilament yarns including para-aramid fibers. The para-aramid multifilament yarn is required to include monofilaments of para-aramid fibers, and may include monofilaments of other fibers (e.g., polyester fibers) according to need. The proportion of the para-aramid fibers may be 50% by mass or larger (in particular, 80-100% by mass) with respect to the whole monofilaments (multifilament yarn), and all the monofilaments are usually constituted by para-aramid fibers.

The multifilament yarn is required to include a plurality of monofilaments, and may include, for example, about 100-5,000 monofilaments, preferably about 300-2,000 monofilaments, more preferably about 600-1,000 monofilaments. The monofilaments may have an average fineness of, for example, about 0.8-10 dtex, preferably about 0.8-5 dtex, more preferably about 1.1-1.7 dtex.

The high-elongation aramid fibers to be used as raw fibers may be para-aramid fibers including repeating units of a single kind (e.g., "Twaron", manufactured by Teijin Ltd., or "Kevlar", manufactured by DU PONT-TORAY Co., Ltd., which are poly(p-phenyleneterephthalamide) fibers) or may be co-para-aramid fibers including repeating units of multiple kinds (e.g., "Technora", manufactured by Teijin Ltd., which is aramid fibers that are a copolymer of poly(p-phenyleneterephthalamide) and 3,4'-oxydiphenyleneterephthalamide).

The number of the high-elongation aramid fibers (multifilament yarns themselves) to be mix-twisted with low-modulus fibers is not particularly limited. The number of the high-elongation aramid fibers may be any number of 1 or larger, and is, for example, about 1-10, preferably about 2-5, more preferably about 3-4 (in particular, 3).

The proportion of the high-elongation aramid fibers in the twisted cord may be 50-99% by mass, and may be, for example, about 60-95% by mass, preferably about 60-90% by mass, more preferably about 70-90% by mass (in particular, 75-85% by mass). In case where the configuration proportion of the high-elongation aramid fibers is too low, there is a possibility that the belt might show increased elongation to cause transmission failures or that increased heat generation might occur due to slips, resulting in a decrease in durability. Conversely, in case where the configuration proportion thereof is too high, there is a possibility that a laminated body of belt-constituting materials including core wires cannot be sufficiently extended in the peripheral direction in belt production and the core wires hence might suffer a disorder in pitch or be damaged, resulting in a decrease in the durability of the belt.

The fineness of the high-elongation aramid fibers (the fineness of each high-elongation aramid fiber in the case of using a plurality of high-elongation aramid fibers) to be mix-twisted with low-modulus fibers can be selected from a range of about 500-3,000 dtex. The fineness thereof may be, for example, about 600-2,000 dtex, preferably about 700-1,700 dtex, more preferably about 800-1,500 dtex (in particular, 1,000-1,200 dtex). In case where the fineness thereof is too low, there is a possibility that the belt might have too high elongation or a shortened life. Conversely, in case where the fineness thereof is too high, there is a possibility that the twisted cord might have reduced bending fatigue resistance, resulting in a decrease in life.

(Low-Modulus Fibers)

The low-modulus fibers, which are the other one kind of raw fibers included in the twisted cord, are required to have a lower tensile modulus than the high-elongation aramid fibers. However, lower tensile modulus is preferred from the standpoint that elongation during belt production can be ensured. Specifically, the tensile modulus of the low-modulus fibers is, for example, 20 GPa or less, and may be preferably 15 GPa or less (e.g., 10 GPa or less), more preferably 8 GPa or less (in particular, 5 GPa or less). For example, the tensile modulus thereof is, for example, about 0.1-10 GPa (in particular, 1-5 GPa). Although there is no particular lower limit on the tensile modulus of the low-modulus fibers, the tensile modulus thereof is, for example, preferably 0.1 GPa or higher.

The low-modulus fibers themselves, which are to be mix-twisted with the high-elongation aramid fibers, may also be either twisted yarns (primarily-twisted yarns) or untwisted yarns. The primary-twist coefficient of the low-modulus fibers themselves can be selected from a range of about 0-6, and is, for example, about 0.1-5, preferably about 0.2-3, more preferably about 0.3-2 (in particular, 0.4-1). In case where the primary-twist coefficient thereof is too large, there is a possibility that the twisted cord might have reduced tensile strength, that the belt might show increased elongation to cause transmission failures, or that increased heat generation might occur due to slips, resulting in a decrease in durability.

The low-modulus fibers to be used as raw fibers usually are also multifilament yarns. The multifilament yarn may include monofilaments of the same kind or include monofilaments of different kinds.

The low-modulus fibers to be used as raw fibers may be, for example, natural fibers (cotton, hemp, etc.), regenerated fibers (rayon, acetate, etc.), synthetic fibers (polyolefin fibers such as polyethylene and polypropylene, styrene-based fibers such as polystyrene, fluoropolymer fibers such as polytetrafluoroethylene, acrylic fibers, poly(vinyl chloride) fibers, poly(vinylidene chloride) fibers, vinyl-alcohol-based fibers such as poly(vinyl alcohol), polyamide fibers, low-elongation aramid fibers, polyester fibers, fully aromatic polyester fibers, polyurethane fibers, etc.), inorganic fibers (carbon fibers, glass fibers, etc.), or the like. One kind of fibers among these can be used alone or two or more kinds among these can be used in combination. Polyamide fibers are preferred of those fibers, and aliphatic polyamide fibers such as nylon-6 and nylon-66 are especially preferred.

The number of the low-modulus fibers (multifilament yarns themselves) to be mix-twisted with the high-elongation aramid fibers is not particularly limited. The number of the low-modulus fibers may be any number of 1 or larger, and is, for example, about 1-5, preferably about 1-3, more preferably about 1-2 (in particular, 1).

The mass ratio between the high-elongation aramid fibers and the low-modulus fibers ((high-elongation aramid fibers)/(low-modulus fibers)) may be about 50/50 to 99/1, and is, for example, about 60/40 to 95/5, preferably about 60/40 to 90/10, more preferably about 70/30 to 90/10 (in particular, 75/25 to 85/15).

The fineness of the low-modulus fibers (the fineness of each low-modulus fiber in the case of using a plurality of low-modulus fibers) to be mix-twisted with the high-elongation aramid fibers can be selected from a range of about 500-3,000 dtex. The fineness thereof may be, for example, about 600-2,000 dtex, preferably about 700-1,500 dtex, more preferably about 800-1,200 dtex (in particular, 850-1,000 dtex). In case where the fineness thereof is too low, there is a possibility that the belt might have too high elongation or a shortened life. Conversely, in case where the fineness thereof is too high, there is a possibility that the twisted cord might have reduced bending fatigue resistance, resulting in a decrease in life.

(Properties of the Twisted Cord)

The twisted cord may be a twisted cord obtained by secondarily-twisting a plurality of primarily-twisted yarns (one or more primarily-twisted yarns of high-elongation aramid fibers and one or more primarily-twisted yarns of low-modulus fibers) or may be a twisted cord (single-twisted cord) obtained by twisting a plurality of untwisted yarns (one or more untwisted yarns of high-elongation aramid fibers and one or more untwisted yarns of low-modulus fibers). Among them, a twisted cord is preferably the one obtained by secondarily-twisting a plurality of primarily-twisted yarns, from the standpoint that this twisted cord can have increased elongation. The twisted cord obtained by secondarily-twisting primarily-twisted yarns may be either a Lang lay cord in which the direction of the primary twisting is the same as the direction of the secondary twisting, or a plied cord in which those directions are opposite. It is also possible to secondarily-twist a plurality of single-twisted yarns, or it is possible to secondarily-twist a single-twisted yarn with a primarily-twisted yarn or to secondarily-twist a single-twisted yarn with an untwisted yarn. Preferred of these is Lang lay from the standpoint that the twisted cord has excellent bending fatigue resistance to attain an improvement in belt life. In cases when a twisted cord is configured by Lang lay, this twisted cord has excellent bending fatigue resistance and, hence, the core wires and the belt are less apt to be reduced in bending fatigue resistance even when the twisted cord has reduced twist coefficient. Because of this, a decrease in tensile strength and an increase in elongation can be inhibited by reducing the twist coefficient in Lang lay.

The primary-twist coefficient of the primarily-twisted yarn (or untwisted yarn) can be selected from the range of 0-7 (e.g., 0-6), and is, for example, about 0.1-5, preferably about 0.3-4. In the case where the twisted cord is one obtained by Lang lay, the primary-twist coefficient (in particular, the primary-twist coefficient of high-elongation aramid core wire) is, for example, about 0.1-3, preferably about 0.2-2, more preferably about 0.3-1 (in particular, 0.4-0.8). In case where the primary-twist coefficient is increased excessively, there is a possibility that the twisted cord might have reduced tensile strength, that the belt might show increased elongation to cause transmission failures, or that increased heat generation might occur due to slips, resulting in a decrease in durability.

The secondary-twist coefficient of the twisted cord (secondarily-twisted yarn) can be selected from the range of 2-6, and is, for example, about 2.5-5.5, preferably about 3-5, more preferably about 3-4 (in particular, 3-3.5). In case where the secondary-twist coefficient is increased excessively, there is a possibility that the twisted cord might have reduced tensile strength, that the belt might show increased elongation to cause transmission failures, or that increased heat generation might occur due to slips, resulting in a decrease in durability. Meanwhile, in case where the secondary-twist coefficient is too low, there is a possibility that the twisted cord might have reduced bending fatigue resistance, resulting in a decrease in belt durability.

In the twisted cord obtained by secondarily-twisting primarily-twisted yarns, the ratio of the secondary-twist coefficient to the primary-twist coefficient of the high-elongation aramid core wire is important. In the case where the twisted cord is one obtained by Lang lay, it is preferable that the secondary-twist coefficient is higher than the primary-twist coefficient of the high-elongation aramid fibers. The ratio of the secondary-twist coefficient to the primary-twist coefficient of the high-elongation aramid fibers (secondary-twist coefficient/primary-twist coefficient) can be selected from the range of 3-10, and is, for example, about 4-8, preferably about 4.5-8 (e.g., 5-7.5), more preferably about 5-7 (in particular, 6.5-7). By increasing the secondary-twist coefficient relative to the primary-twist coefficient of the high-elongation aramid fibers, an improvement in bending fatigue resistance can be attained to improve the durability. Although details of a mechanism by which the durability is improved are unclear, the following can be presumed. Increasing both the primary-twist coefficient and the secondary-twist coefficient results in the increased demerit of increasing the elongation, whereas reducing the primary-twist coefficient and increasing the secondary-twist coefficient bring about an improved balance between modulus and bending fatigue resistance to improve the durability.

Meanwhile, in the case where the twisted cord is a plied cord, it is preferable that the secondary-twist coefficient is close to the primary-twist coefficient of the high-elongation aramid fibers. The ratio of the secondary-twist coefficient to the primary-twist coefficient of the high-elongation aramid fibers (secondary-twist coefficient/primary-twist coefficient) can be selected from the range of 0.5-2, and is, for example, about 0.6-1.5, preferably about 0.7-1.2, more preferably about 0.75-1 (in particular, 0.8-0.9). By increasing the primary-twist coefficient of the high-elongation aramid fibers so as to be close to the secondary-twist coefficient, this twisted cord, although being a plied cord, can be made to have improved bending fatigue resistance.

The total fineness of the twisted cord (secondarily-twisted yarn) can be selected, for example, from a range of about 1,000-10,000 dtex. The total fineness thereof is, for example, about 2,000-8,000 dtex, preferably about 2,500-7,000 dtex, more preferably about 3,000-6,000 dtex (in particular, 3,500-5,000 dtex). In case where the value of total fineness thereof is too small, there is a possibility that the belt might have increased elongation or a shortened life. In case where the value of total fineness is too large, there is a possibility that the twisted cord might have reduced bending fatigue resistance, resulting in a shortened life.

(Core Wire Preparation Step)

The V-ribbed belt of the present invention is required to include the twisted cord described above. Usually, the V-ribbed belt includes core wires obtained through a core wire preparation step in which the twisted cord is subjected to a bonding treatment.

In the core wire preparation step, a common bonding treatment may be conducted in order to enhance the strength of adhesion between the twisted cord, which constitutes core wires, and rubbers. Examples of such bonding treatments include: a method in which the twisted cord is immersed in a treatment liquid containing an epoxy compound or polyisocyanate compound; a method in which the twisted cord is immersed in an RFL treatment liquid including resorcinol, formaldehyde, and a latex; and a method in which the twisted cord is immersed in a rubber cement. One of these treatments may be applied alone, or two or more thereof may be applied in combination. Also usable besides such immersion is a method of spraying or applying. However, immersion is preferred from the standpoints that it is easy to infiltrate the bonding components into inner portions of the core wire and that it is easy to form a bonding layer having a uniform thickness.

In particular, in the core wire preparation step, a heat treatment for drying or curing may be performed after adhesion of various bonding components. Especially after a treatment with the RFL treatment liquid, it is preferred to conduct a heat treatment for performing a stretching-thermal fixation. The heat-set stretching ratio in this heat treatment may be about 0-3%, and may be preferably about 0.1-2.5%, more preferably about 0.5-2%. In the present invention, an extension potential during vulcanization can be ensured by making the heat-set stretching ratio small. Consequently, rib shapes can be stably formed and the core wires can be inhibited from suffering a disorder in pitch or being damaged.

In this description and the claims, heat-set stretching ratio can be determined by measuring the speeds of the core wire at the inlet and outlet of the heat treatment oven and calculating the stretching ratio using the following equation.

Heat-set stretching ratio (%)={((speed of core wire at outlet of heat treatment oven)−(speed of core wire at inlet of heat treatment oven))/(speed of core wire at inlet of heat treatment oven)}×100

(V-Ribbed Belt)

Configurations of the V-ribbed belt of the present invention are not particularly limited so long as the belt has a plurality of V-rib parts extending parallel with each other in the longitudinal direction of the belt. Examples thereof include the configuration shown in FIG. 1. FIG. 1 is a schematic cross-sectional view illustrating one example of the V-ribbed belt of the present invention. The V-ribbed belt shown in FIG. 1 has a configuration in which a compression rubber layer 2, an adhesion rubber layer 4 which includes core wires 1 embedded therein and extending in the longitudinal direction of the belt, and a tension layer 5 constituted by cover fabric (woven fabric, knitted fabric, nonwoven fabric, or the like) or rubber composition, are laminated in this order from the lower surface (inner circumferential surface) toward the upper surface (back surface) of the belt. The compression rubber layer 2 has a plurality of grooves formed therein which each have a cross-section in the shape of the letter V and extend in the longitudinal direction of the belt. Between the grooves have been formed a plurality of (four in the example shown in FIG. 1) V-rib parts 3 each having a cross-section in the shape of the letter V (the shape of an inverted trapezoid). The two inclined faces (surfaces) of each V-rib part 3 constitute frictional power-transmission surfaces and are to be in contact with a pulley to transmit (frictionally transmit) power.

The V-ribbed belt of the present invention is not limited to ones having the configuration described above, and may have any configuration including a compression rubber layer which has a transmission surface, at least some of which is capable of being in contact with the V-rib grooves (V grooves) of a pulley. Typically, the belt may have any configuration including a tension layer, a compression rubber layer, and core wires embedded therebetween along the longitudinal direction of the belt. In the V-ribbed belt of the present invention, for example, core wires 1 may be embedded between a tension layer 5 and a compression rubber layer 2 without disposing an adhesion rubber layer 4. Furthermore, use may be made of a configuration in which an adhesion rubber layer 4 is disposed on either a compression rubber layer 2 or a tension layer 5 and core wires 1 are embedded between the adhesion rubber layer 4 (compression rubber layer 2 side) and the tension layer 5 or between the adhesion rubber layer 4 (tension layer 5 side) and the compression rubber layer 2.

At least the compression rubber layer 2 may be formed by the rubber composition which will be described later in detail, and the adhesion rubber layer 4 may be formed by a common rubber composition for use in forming adhesion rubber layers. The tension layer 5 may be constituted by common cover fabrics for use as tension layers or may be formed by a rubber composition, which need not be the same as that used for forming the compression rubber layer 2.

Since the V-ribbed belt of the present invention is excellent in terms of noiselessness and durability even in applications where high dynamic tension occurs, this V-ribbed belt is preferably one commonly used in applications where high dynamic tension occur. Examples of such V-ribbed belts include a V-ribbed belt in which at least some of the frictional power-transmission surface is covered with cloth. Although the covering with cloth is not particularly limited so long as at least some of the frictional power-transmission surface is covered, the entire frictional power-transmission surface is usually covered with cloth.

(Core Wires)

The adhesion rubber layer 4 includes a plurality of core wires 1 disposed therein which each extend in the longitudinal direction of the belt and which are separated from each other at a given pitch along the width direction of the belt.

The average pitch of the core wires (average distance between the centers of adjacent core wires) can be suitably selected in accordance with the diameter of the core wires and the desired tensile strength of the belt. The average pitch thereof is, for example, about 0.6-2 mm, preferably about 0.8-1.5 mm, more preferably about 0.9-1.05 mm. In case where the average pitch of the core wires is too small, there is a possibility that overlapping of core wires might occur in a belt production step. Conversely, in case where the average pitch thereof is too large, there is a possibility that the belt might have a reduced tensile strength and a reduced tensile modulus. The average pitch of the core wires is a value determined by examining a cross-section of the width direction of the V-ribbed belt to measure the distance between the centers of adjacent core wires in each of ten portions and averaging the measured distances. The distance between the centers of adjacent core wires can be measured with a known device such as a scanning electron microscope (SEM) or a projector.

The core wires may be either S-twisted cords or Z-twisted cords. It is, however, preferred to alternately dispose S-twisted cords and Z-twisted cords in order to enhance the straight-running properties of the belt. Besides the bonding treatment described above, the core wires may be coated with a rubber composition including a rubber component constituting the adhesion rubber layer.

(Rubber Composition)

The compression rubber layer 2, the adhesion rubber layer 4, and the tension layer 5 may be formed by a rubber composition including a rubber component. As the rubber component, use may be made of a rubber which can be vulcanized or crosslinked. Examples thereof include diene-based rubbers (natural rubber, isoprene rubbers, butadiene rubbers, chloroprene rubbers, styrene/butadiene rubbers (SBR), acrylonitrile/butadiene rubbers (nitrile rubbers), hydrogenated nitrile rubbers, etc.), ethylene-α-olefin elastomers, chlorosulfonated polyethylene rubbers, alkylated chlorosulfonated polyethylene rubbers, epichlorohydrin rubbers, acrylic rubbers, silicone rubbers, urethane rubbers, and fluororubbers. One of these rubber components can be used alone, or two or more thereof can be used in combination. Preferred rubber components are ethylene-α-olefin elastomers (ethylene-propylene copolymers (EPM), ethylene-propylene-diene terpolymers (EPDM), etc.) and chloroprene rubbers. Especially preferred are ethylene-α-olefin elastomers (ethylene-propylene copolymers (EPM), ethylene-propylene-diene terpolymers (EPDM), etc.), from the standpoint that these elastomers have ozone resistance, heat resistance, cold resistance, and weatherability and are effective in a reduction of belt weight. In the case where the rubber component includes an ethylene-α-olefin elastomer, the proportion of the ethylene-α-olefin elastomer in the rubber component may be 50% by mass or higher (in particular, 80-100% by mass), and is especially preferably 100% by mass (the ethylene-α-olefin elastomer is the only component).

The rubber composition may further include staple fibers. Examples of the staple fibers include: synthetic fibers such as polyolefin-based fibers (polyethylene fibers, polypropylene fibers, etc.), polyamide fibers (polyamide-6 fibers, polyamide-66 fibers, polyamide-46 fibers, aramid fibers, etc.), poly(alkylene arylate)-based fibers (e.g., $C_{2-4}$ alkylene/$C_{8-14}$ arylate polymer fibers such as poly(ethylene terephthalate) (PET) fibers, poly(trimethylene terephthalate) (PTT) fibers, poly(butylene terephthalate) (PBT) fibers, and poly(ethylene naphthalate) (PEN) fibers), vinylon fibers, poly(vinyl alcohol)-based fibers, and poly(p-phenylene-benzobisoxazole) (PBO) fibers; natural fibers such as cotton, hemp, and wool; and inorganic fibers such as carbon fibers. One kind of staple fibers among these can be used alone, or two or more kinds among these can be used in combination. Like the core wires, the staple fibers may be subjected to a common bonding treatment (or surface treatment) in order to improve the dispersibility and adhesion within the rubber composition.

The rubber composition may further contain common additives. Examples of the common additives include vulcanizing agents or crosslinking agents (or crosslinking agent type) (e.g., sulfur-based vulcanizing agents), co-crosslinking agents (e.g., bismaleimide compounds), vulcanization aids or vulcanization accelerators (e.g., thiuram type accelerators), vulcanization retarders, metal oxides (e.g., zinc oxide, magnesium oxide, calcium oxide, barium oxide, iron oxide, copper oxide, titanium oxide, and aluminum oxide), reinforcing agents (e.g., carbon black and silicon oxide such as hydrated silica), fillers (e.g., clay, calcium carbonate, talc, and mica), softeners (e.g., oils such as paraffin oil and naphthenic oil), finishing agents or finishing aids (e.g., stearic acid, metal salts of stearic acid, waxes, paraffins, and aliphatic acid amides), anti-aging agents (e.g., antioxidants, anti-heat aging agents, bending-crack inhibitors, and ozone-deterioration inhibitors), colorants, tackifiers, plasticizers, coupling agents (e.g., silane coupling agents), stabilizers (e.g., ultraviolet absorbers and heat stabilizers), flame retardants, and antistatic agents. One of these additives can be used alone, or two or more thereof can be used in combination. The metal oxides may function as a crosslinking agent. The rubber composition especially for constituting the adhesion rubber layer 4 may include an adhesiveness improver (e.g., a resorcinol-formaldehyde co-condensation product or an amino resin).

The rubber compositions respectively for constituting the compression rubber layer 2, adhesion rubber layer 4, and tension layer 5 may be the same each other or different each other. Likewise, the staple fibers included in the compression rubber layer 2, adhesion rubber layer 4, and tension layer 5, may be the same each other or different each other.

(Cover Fabrics)

The tension layer 5 may be constituted by cover fabrics. The cover fabrics can be constituted, for example, by a fabric material such as woven fabric, wide-angle fabric, knitted fabric, nonwoven fabric, or the like (preferably, woven fabric). According to need, the cover fabric may be laminated on the compression rubber layer and/or the adhesion rubber layer in the configuration described above, after being subjected to a bonding treatment such as a treatment (e.g., immersion treatment) with an RFL treatment liquid, a friction in which an adhesion rubber is rubbed into the fabric material, or a laminating (coating) with the adhesion rubber.

(Cloth Covering Frictional Power-Transmission Surface)

As the cloth which covers at least some of the frictional power-transmission surface, use can be made of any of the fabric materials shown above as examples of the cover fabric. Like the cover fabric, the fabric materials may be subjected to a bonding treatment. Among those fabric materials, preferred for use as the cloth for covering the frictional power-transmission surface is a knitted fabric from the standpoint of excellent durability and expansibility. The material of the knitted fabric is not particularly limited, and examples thereof include low-modulus fibers and the fibers shown above as examples of staple fibers for incorporation into the belt. The knitted fabric may be knitted fabric of both cellulosic fibers (e.g., cotton yarns) and polyester-based fibers (e.g., PTT/PET conjugate fibers).

(Methods for Producing the V-Ribbed Belt)

For producing method of the V-ribbed belt of the present invention, any method including the core wire preparation step described above may be used. Common method for producing a V-ribbed belt can be used.

Aa a first production method, a method can be exemplified which includes: a step in which an unvulcanized sleeve is formed by disposing an unvulcanized tension rubber sheet, core wires, and an unvulcanized compression rubber sheet on an inner mold equipped with a plastic jacket in this order from the inner-circumference side; and a step in which the plastic jacket is expanded to press the unvulcanized sleeve, from the inner-circumference side, against an outer mold having a rib-shaped contour and the unvulcanized sleeve is vulcanized, thereby obtaining a vulcanized sleeve having a rib-shaped surface.

Aa a second production method, a method can be exemplified which includes: a step in which a first unvulcanized sleeve is formed by disposing an unvulcanized compression rubber sheet on an inner mold equipped with a plastic jacket; a step in which the plastic jacket is expanded to press the first unvulcanized sleeve, from the inner-circumference side, against an outer mold having a rib-shaped contour, thereby forming a pre-molded body having a rib-shaped surface; a step in which the expansion of the plastic jacket is ceased, the inner mold equipped with the plastic jacket is separated from the outer mold having the pre-molded body adherent thereto, and thereafter an unvulcanized tension rubber sheet and core wires are successively disposed on the inner mold equipped with the plastic jacket to form a second unvulcanized sleeve; and a step in which the plastic jacket is expanded again to press the second unvulcanized sleeve, from the inner-circumference side, against the outer mold having the pre-molded body adherent thereto and the second unvulcanized sleeve is vulcanized integrally with the pre-molded body, thereby obtaining a vulcanized sleeve having a rib-shaped surface.

In the case of covering a frictional power-transmission surface with cloth, the cloth may be disposed on the outermost layer (outer-circumference side) of the unvulcanized sleeve which comes into contact with the outer mold. Meanwhile, an adhesion rubber sheet may be disposed between the core wires and the tension rubber sheet and/or between the core wires and the compression rubber sheet.

Of these methods, the first production method has excellent production efficiency because the steps are simple, while the second production method is effective in inhibiting the belt from having reduced durability because the degree of extension of the core wires can be reduced by narrowing the spacing between the inner mold and the outer mold and, hence, the core wires can be inhibited from being damaged. Although a production method can be selected in accordance with a priority matter among production efficiency and durability, it is preferred to select the second production method in view of the object of the present invention.

EXAMPLES

The present invention is explained below in more detail by reference to Examples, but the present invention should not be limited by the following Examples. Details of materials used in the Examples and the methods used for determining evaluation items are shown below.

(Materials)

(Twisted Cords)

Aramid 1: "Technora (registered trademark)", manufactured by Teij in Ltd.; intermediate elongation, 0.9%; tensile modulus, 70 GPa Aramid 2: "Twaron (registered trademark)", manufactured by Teij in Ltd.; intermediate elongation, 1.0%; tensile modulus, 60 GPa (low-modulus type)

Aramid 3: "Twaron (registered trademark)", manufactured by Teij in Ltd.; intermediate elongation, 0.6%; tensile modulus, 80 GPa (standard type)

Aliphatic polyamide: "Leona (registered trademark) Nylon-66", manufactured by Asahi Chemical Co., Ltd.; intermediate elongation, 11%; tensile modulus, 3.8 GPa (Bonding Treatment Liquids)

Polymeric MDI: "Millionate (registered trademark) MR-200", manufactured by Tosoh Corp.; NCO content, 30%

NBR latex: "Nipol (registered trademark) 1562, manufactured by Nippon Zeon Co., Ltd.; total solid content, 41%; middle high nitrile type Polyolefin-based adhesive: "Chemlok (registered trademark) 233X", manufactured by Lord Corp.; solid content, 27%

(Belts)

EPDM: "NORDEL (registered trademark) IP3640, manufactured by Dow Chemical Japan Ltd.; ethylene content, 55%; ethylidenenorbornene content, 1.8%

Carbon black HAF: "Seast (registered trademark) 3", manufactured by Tokai Carbon Co., Ltd.

Paraffin oil: "Diana (registered trademark) Process Oil", manufactured by Idemitsu Kosan Co., Ltd.

Anti-aging agent: "Nonflex (registered trademark) OD3", manufactured by Seiko Chemical Co., Ltd.

Organic peroxide: "Perkadox (registered trademark) 14RP, manufactured by Kayaku Akzo Corp.

Nylon staple fibers: "Nylon-66", manufactured by Asahi Chemical Co., Ltd.: fiber length, about 0.5 mm Knitted fabric: weft-knitted fabric configured of cotton yarns and PTT/PET conjugate yarns (Elongation at 200 N)

A measurement was made in accordance with JIS L1017 (2002). Specifically, a core wire alone (prepared cord which had undergone bonding treatment) was set on a pair of chucks of autograph so that the cord was held straight without being slacked. The chuck-to-chuck distance in this stage is expressed by $L_0$ (about 250 mm). Next, one of the chucks was moved at a speed of 300 mm/min to impose tensile load on the cord, and the tensile load and the chuck-to-chuck distance were recorded. The chuck-to-chuck distance at the time when the tensile load reached 200 N is expressed by $L_1$ (mm), and the elongation at 200 N was determined using the following equation.

Elongation at 200 N (%)=(($L_1$-$L_0$)/$L_0$)×100

(Bending Fatigue Test (Retention of Strength))

Figure 2:
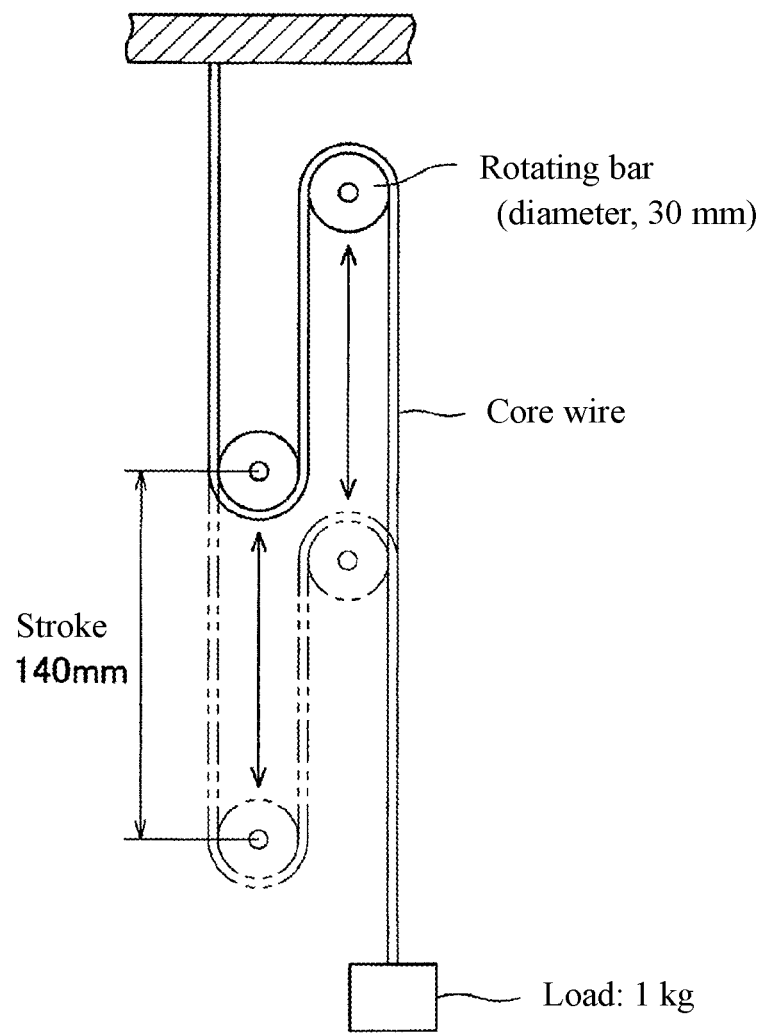
FIG. 2 is a schematic view illustrating a tester for evaluating, through a bending fatigue test, the core wires obtained in the Examples and Comparative Examples.

As FIG. 2 shows, a core wire alone (prepared cord which had undergone bonding treatment) was wound, while being bent in the shape of the letter S, around a pair of cylindrical rotating bars (diameter, 30 mm) disposed in a vertical arrangement. One end of the core wire was fixed to a frame, and a load of 1 kg was imposed on the other end. Next, the pair of rotating bars was vertically reciprocated 100,000 times (stroke, 140 mm; cycle, 100 times/min) while keeping the relative distance therebetween constant, thereby repeating winding of the core wire around the rotating bars and unwinding of the core wire therefrom. Thus, the core wire itself was caused to undergo bending fatigue. This core wire itself which had undergone the bending fatigue test was examined for tensile strength (residual strength), and a retention of strength was calculated from a tensile strength value of before the bending fatigue test which had been measured beforehand.

Retention of strength (%)=((tensile strength after bending)/(tensile strength before bending))×100

(Durability Running Test (Running Life))

Figure 3:
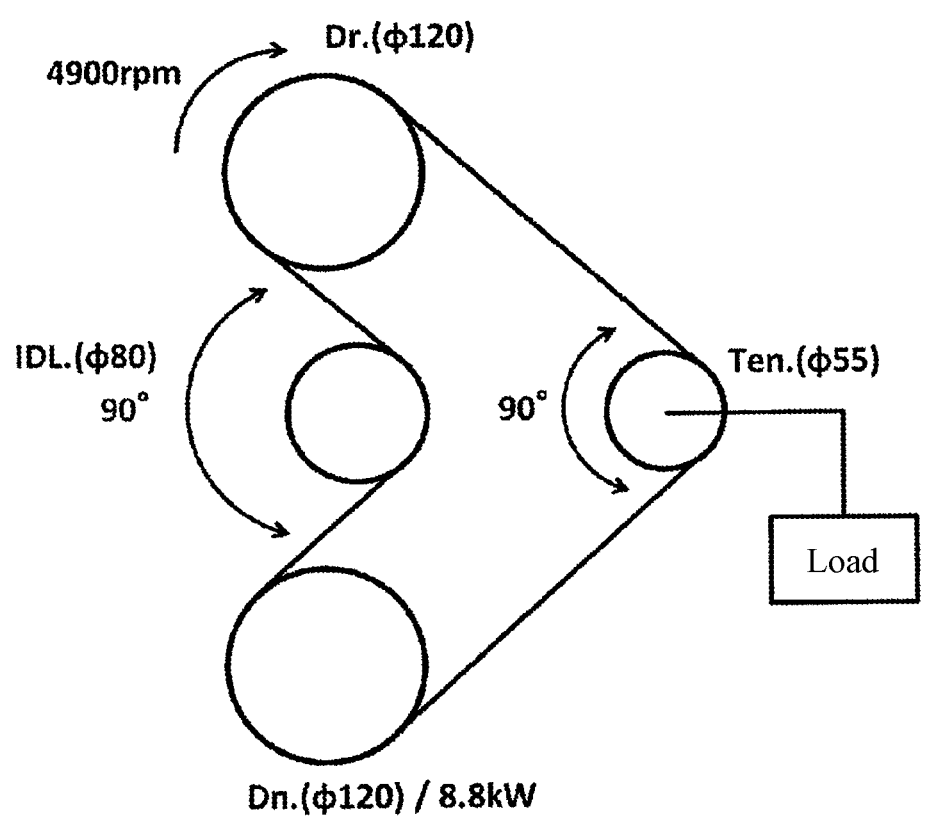
FIG. 3 is a schematic view illustrating a tester for evaluating, through a durability running test, the V-ribbed belts obtained in the Examples and Comparative Examples.

A test was performed using a tester having the layout shown in FIG. 3, in which a driving pulley (Dr.) having a diameter of 120 mm, a tension pulley (Ten.) having a diameter of 55 mm, a driven pulley (Dn.) having a diameter of 120 mm, and an idler pulley (IDL.) having a diameter of 80 mm are disposed in this order. A V-ribbed belt was wound around each of the pulleys of the tester. The rotational speed of the driving pulley was regulated to 4,900 rpm, the belt winding angle for the idler pulley was adjusted to 90°, the belt winding angle for the tension pulley was adjusted to 90°, the driven-pulley load was set at 8.8 kW, and a constant load (about 560 N) was applied so as to result in an initial belt tension of 395 N. The belt was thus caused to run at an ambient temperature of 100° C. until the life end thereof was reached.

Example 1

(Preparation of Twisted Cord)

As shown in Table 5, three primarily-twisted yarns each obtained by primarily-twisting a bundle of fibers of aramid 1, which had a fineness of 1,670 dtex, at a twist coefficient of 1 and one primarily-twisted yarn obtained by primarily-twisting a bundle of fibers of the aliphatic polyamide, which had a fineness of 940 dtex, at a twist coefficient of 3 in the same direction as the aramid fibers were collected and secondarily-twisted at a twist coefficient of 3.5 in the same direction as in the primary twisting. Thus, a twisted cord was produced by Lang lay.

(Bonding Treatment of Cord)

First, the twisted cord prepared was immersed for 5 seconds in a treatment liquid (25° C.) shown in Table 1, which included an isocyanate compound, and then dried at 150° C. for 2 minutes (pre-dip treatment step). Subsequently, the twisted cord which had undergone the pre-dip treatment was immersed for 5 seconds in the RFL treatment liquid (25° C.) shown in Table 2 and was then heat-treated at 200° C. for 2 minutes (RFL treatment step). During this heat treatment, the twisted cord was subjected to a stretching-thermal fixation at a heat-set stretching ratio of 0-3%. Furthermore, the twisted cord which had undergone the RFL treatment was immersed for 5 seconds in the treatment liquid (solid concentration, 7%; 25° C.) which included a bonding component shown in Table 3, and then dried at 160°

C. for 4 minutes (overcoating step). Thus, a cord which had undergone the bonding treatment was obtained.

TABLE 1

(Pre-dip treatment liquid)

| Chemicals mixed | Parts by mass |
|---|---|
| Polymeric MDI | 10 |
| Toluene | 100 |
| Total | 110 |

TABLE 2

(RFL treatment liquid)

| Chemicals mixed | Parts by mass |
|---|---|
| NBR latex | 289.6 |
| Resorcinol | 30 |
| 37% formalin | 18.6 |
| Water | 515 |
| Polymeric MDI | 37 |
| Total | 890.2 |

TABLE 3

(Overcoating liquid)

| Chemicals mixed | Parts by mass |
|---|---|
| Polyolefin-based adhesive | 18 |
| Toluene | 51.2 |
| Total | 69.2 |

(Production of Belt)

A vulcanized sleeve having a rib-shaped surface was obtained through the following steps: a step in which an unvulcanized compression rubber sheet having the composition shown in Table 4 and the knitted fabric were disposed, in this order from the inner-circumference side, on an inner mold equipped with a plastic jacket, thereby forming a first unvulcanized sleeve; a step in which the plastic jacket was expanded to press the first unvulcanized sleeve, from the inner-circumference side, against an outer mold having a rib-shaped contour, thereby forming a pre-molded body having a rib-shaped surface; a step in which the expansion of the plastic jacket was ceased, the inner mold equipped with the plastic jacket was separated from the outer mold having the pre-molded body adherent thereto, and thereafter an unvulcanized tension rubber sheet having the composition shown in Table 4 and the cord which had undergone the bonding treatment were successively disposed on the inner mold equipped with the plastic jacket to form a second unvulcanized sleeve; and a step in which the plastic jacket was expanded again to press the second unvulcanized sleeve, from the inner-circumference side, against the outer mold having the pre-molded body adherent thereto and the second unvulcanized sleeve was vulcanized integrally with the pre-molded body. The resulting vulcanized sleeve was cut with a cutter along a direction parallel with the circumferential direction, thereby obtaining a V-ribbed belt (belt size, 3PK1100; rib shape, K; number of ribs, 3; circumference, 1,100 mm).

TABLE 4

(Rubber compositions)

| Material | Compression rubber | Tension rubber |
|---|---|---|
| EPDM | 100 | 100 |
| Zinc oxide | 5 | 5 |
| Stearic acid | 1 | 1 |
| Carbon black HAF | 80 | 80 |
| Paraffin oil | 15 | 15 |
| Anti-aging agent | 2 | 2 |
| Organic peroxide | 5 | 5 |
| Nylon staple fibers | 0 | 15 |
| Total | 208 | 223 |

Example 2

A V-ribbed belt was produced in the same manner as in Example 1, except that the secondary-twist coefficient in the twisted-cord preparation was changed to 4.

Example 3

A V-ribbed belt was produced in the same manner as in Example 1, except that the secondary-twist coefficient in the twisted-cord preparation was changed to 4.5.

Example 4

A V-ribbed belt was produced in the same manner as in Example 1, except that in the twisted-cord preparation, three primarily-twisted yarns each obtained by primarily-twisting a bundle of fibers of aramid 2, which had a fineness of 1,100 dtex, at a twist coefficient of 0.5 and one primarily-twisted yarn obtained by primarily-twisting a bundle of fibers of the aliphatic polyamide, which had a fineness of 940 dtex, at a twist coefficient of 0.5 in the same direction as the aramid fibers were collected and secondarily-twisted at a twist coefficient of 3 in the same direction as in the primary twisting to produce a twisted cord by Lang lay.

Example 5

A V-ribbed belt was produced in the same manner as in Example 4, except that the secondary-twist coefficient in the twisted-cord preparation was changed to 3.5.

Example 6

A V-ribbed belt was produced in the same manner as in Example 4, except that the secondary-twist coefficient in the twisted-cord preparation was changed to 4.

Example 7

A V-ribbed belt was produced in the same manner as in Example 1, except that in the twisted-cord preparation, three primarily-twisted yarns each obtained by primarily-twisting a bundle of fibers of aramid 2, which had a fineness of 1,100 dtex, at a twist coefficient of 3.5 and one primarily-twisted yarn obtained by primarily-twisting a bundle of fibers of the aliphatic polyamide, which had a fineness of 940 dtex, at a twist coefficient of 0.5 in the same direction as the aramid fibers were collected and secondarily-twisted at a twist coefficient of 3 in the direction opposite to that in the primary twisting to produce a plied cord.

Example 8

A V-ribbed belt was produced in the same manner as in Example 7, except that the primary-twist coefficient of the aramid fibers 2 in the twisted-cord preparation was changed to 4.

Example 9

A V-ribbed belt was produced in the same manner as in Example 8, except that the secondary-twist coefficient in the twisted-cord preparation was changed to 3.5.

Example 10

A V-ribbed belt was produced in the same manner as in Example 6, except that in the twisted-cord preparation, the bundles of fibers of aramid 2 were subjected to secondary twisting without being primarily-twisted.

Example 11

A V-ribbed belt was produced in the same manner as in Example 6, except that the secondary-twist coefficient in the twisted-cord preparation was changed to 4.5.

Example 12

A V-ribbed belt was produced in the same manner as in Example 4, except that in the twisted-cord preparation, the primary-twist coefficient of the bundles of fibers of aramid 2 and the bundle of fibers of the aliphatic polyamide were changed to 1.5.

Example 13

A V-ribbed belt was produced in the same manner as in Example 9, except that in the twisted-cord preparation, the primary-twist coefficient of the bundles of fibers of aramid 2 was changed to 6.5 and the secondary-twist coefficient was changed to 6.5.

Comparative Example 1

A V-ribbed belt was produced in the same manner as in Example 1, except that in the twisted-cord preparation, three primarily-twisted yarns each obtained by primarily-twisting a bundle of fibers of aramid 3, which had a fineness of 1,100 dtex, at a twist coefficient of 1 and one primarily-twisted yarn obtained by primarily-twisting a bundle of fibers of the aliphatic polyamide, which had a fineness of 940 dtex, at a twist coefficient of 3 in the same direction as the aramid fibers were collected and secondarily-twisted at a twist coefficient of 2.5 in the direction opposite to that in the primary twisting to produce a plied cord.

Comparative Example 2

A V-ribbed belt was produced in the same manner as in Comparative Example 1, except that the secondary-twist coefficient in the twisted-cord preparation was changed to 3.5.

Comparative Example 3

A V-ribbed belt was produced in the same manner as in Comparative Example 1, except that the secondary-twist coefficient in the twisted-cord preparation was changed to 4.

The results of the evaluation of the cords that had undergone a bonding treatment and the V-ribbed belts, which were obtained in Examples 1 to 13 and Comparative Examples 1 to 3, are shown in Tables 5 to 7.

TABLE 5

| | | Example | | | | | |
|---|---|---|---|---|---|---|---|
| | | 1 | 2 | 3 | 4 | 5 | 6 |
| Cord configuration | Aramid 1 | 1670T/1 × 3 | 1670T/1 × 3 | 1670T/1 × 3 | — | — | — |
| | Aramid 2 | — | — | — | 1100T/1 × 3 | 1100T/1 × 3 | 1100T/1 × 3 |
| | Aramid 3 | — | — | — | — | — | — |
| | Aliphatic polyamide | 940T/1 | 940T/1 | 940T/1 | 940T/1 | 940T/1 | 940T/1 |
| Proportion of high-elongation aramid fibers (mass %) | | 84 | 84 | 84 | 78 | 78 | 78 |
| Twist coefficient | Aramid (primary-twist) | 1 | 1 | 1 | 0.5 | 0.5 | 0.5 |
| | Aliphatic polyamide (primary-twist) | 3 | 3 | 3 | 0.5 | 0.5 | 0.5 |
| | Secondary-twist | 3.5 | 4 | 4.5 | 3 | 3.5 | 4 |
| Mode of twisting | | Lang | Lang | Lang | Lang | Lang | Lang |
| (Secondary-twist coefficient)/(primary-twist coefficient) | | 3.5 | 4 | 4.5 | 6 | 7 | 8 |
| Cord properties | Elongation at 200N (%) | 2.0 | 2.0 | 2.4 | 2.7 | 2.8 | 2.6 |
| | Tensile strength (N) | 808 | 720 | 616 | 549 | 528 | 452 |
| | Residual strength (N) | 640 | 590 | 525 | 505 | 488 | 440 |
| | Retention of strength (%) | 79 | 82 | 85 | 92 | 92 | 97 |
| Belt properties | Tensile strength (kN/rib) | 2.4 | 2.2 | 1.7 | 2.0 | 2.0 | 1.7 |
| | Running life (hr) | 214 | 273 | 469 | 620 | 640 | 550 |

TABLE 6

| | | Example | | | | | | |
|---|---|---|---|---|---|---|---|---|
| | | 7 | 8 | 9 | 10 | 11 | 12 | 13 |
| Cord configuration | Aramid 1 | — | — | — | — | — | — | — |
| | Aramid 2 | 1100T/1 × 3 | 1100T/1 × 3 | 1100T/1 × 3 | 1100T/1 × 3 | 1100T/1 × 3 | 1100T/1 × 3 | 1100T/1 × 3 |
| | Aramid 3 | — | — | — | — | — | — | — |
| | Aliphatic polyamide | 940T/1 | 940T/1 | 940T/1 | 940T/1 | 940T/1 | 940T/1 | 940T/1 |

TABLE 6-continued

|  |  | Example | | | | | | |
|---|---|---|---|---|---|---|---|---|
|  |  | 7 | 8 | 9 | 10 | 11 | 12 | 13 |
| Proportion of high-elongation aramid fibers (mass %) | | 78 | 78 | 78 | 78 | 78 | 78 | 78 |
| Twist coefficient | Aramid (primary-twist) | 3.5 | 4 | 4 | 0 | 0.5 | 1.5 | 6.5 |
|  | Aliphatic polyamide (primary-twist) | 0.5 | 0.5 | 0.5 | 0.5 | 0.5 | 1.5 | 0.5 |
|  | Secondary-twist | 3 | 3 | 3.5 | 4 | 4.5 | 3 | 6.5 |
| Mode of twisting | | plied | plied | plied | Lang | Lang | Lang | plied |
| (Secondary-twist coefficient)/(primary-twist coefficient) | | 0.86 | 0.75 | 0.88 | — | 9 | 2 | 1 |
| Cord properties | Elongation at 200N (%) | 2.5 | 2.5 | 2.7 | 2.0 | 2.8 | 2.7 | 2.9 |
|  | Tensile strength (N) | 591 | 582 | 552 | 680 | 410 | 520 | 400 |
|  | Residual strength (N) | 540 | 537 | 512 | 580 | 400 | 480 | 340 |
|  | Retention of strength (%) | 91 | 92 | 93 | 85 | 98 | 92 | 85 |
| Belt properties | Tensile strength (kN/rib) | 2.1 | 2.1 | 2.0 | 2.1 | 1.7 | 1.9 | 1.6 |
|  | Running life (hr) | 520 | 550 | 560 | 400 | 450 | 480 | 450 |

TABLE 7

|  |  | Comparative Example | | |
|---|---|---|---|---|
|  |  | 1 | 2 | 3 |
| Cord configuration | Aramid 1 | — | — | — |
|  | Aramid 2 | — | — | — |
|  | Aramid 3 | 1100T/1 × 3 | 1100T/1 × 3 | 1100T/1 × 3 |
|  | Aliphatic polyamide | 940T/1 | 940T/1 | 940T/1 |
| Proportion of high-elongation aramid fibers (mass %) | | 0 | 0 | 0 |
| Twist coefficient | Aramid (primary-twist) | 1 | 1 | 1 |
|  | Aliphatic polyamide (primary-twist) | 3 | 3 | 3 |
|  | Secondary-twist | 2.5 | 3.5 | 4 |
| Mode of twisting | | plied | plied | plied |
| (Secondary-twist coefficient)/(primary-twist coefficient) | | 2.5 | 3.5 | 4 |
| Cord properties | Elongation at 200N (%) | 1.6 | 1.7 | 1.8 |
|  | Tensile strength (N) | 720 | 700 | 660 |
|  | Residual strength (N) | 520 | 501 | 488 |
|  | Retention of strength (%) | 72 | 72 | 74 |
| Belt properties | Tensile strength (kN/rib) | 2.2 | 2.0 | 1.9 |
|  | Running life (hr) | 120 | 110 | 90 |

(Results and Discussion)

As apparent from the results in Tables 5 to 7, Comparative Examples 1 to 3, in which aramid 3 having a low intermediate elongation had been used as aramid fibers, each gave cord properties including an elongation at 200 n as low as less than 2.0 and a retention of strength in the bending fatigue test as low as less than 75%. Furthermore, Comparative Examples 1 to 3 each gave belt properties including a running life as short as less than 200 hours. The reason for the short running life can be presumed to be that during the belt production (during vulcanization), the rubber had received high resistance when passing through the cords, because of the low elongation of the cords which had undergone the bonding treatment, and that some of the cords hence had changed in position, resulting in a disorder in core-wire pitch. Namely, it can be presumed that the disorder in core-wire pitch had resulted in uneven allocation of tension in the belt and the core wires to which high tension was imposed were prone to suffer filament breakage.

Meanwhile, Examples 1 to 13, in which aramids 1 and 2 having high intermediate elongations had been used, each gave cord properties including a retention of strength in the bending fatigue test as high as 75% or higher and belt properties including a running life as long as 200 hours or more. In particular, Examples 4 to 13 which used aramid 2, which was the highest in intermediate elongation among the aramid fibers used above, showed especially long running lives.

Among Examples 4 to 13, Examples 4 to 9 showed long running lives because the twist coefficients had been regulated to values within appropriate ranges. In comparisons among the Examples employing Lang lay cords, Example 10 was lower in retention of strength and running life than Examples 4 to 6 probably because use of the aramid fibers which had not been primarily-twisted resulted in a decrease in bending fatigue resistance. Example 11, in which the ratio of the secondary-twist coefficient to the primary-twist coefficient had been 9, was lower in running life than Examples 4 to 6. Example 12, in which the ratio of the secondary-twist coefficient to the primary-twist coefficient had been 2, was lower in running life than Examples 4 to 6. Example 13, in which the secondary-twist coefficient and the primary-twist coefficient had been 6.5, was lower in retention of strength and running life than Examples 7 to 9.

Figure 4:
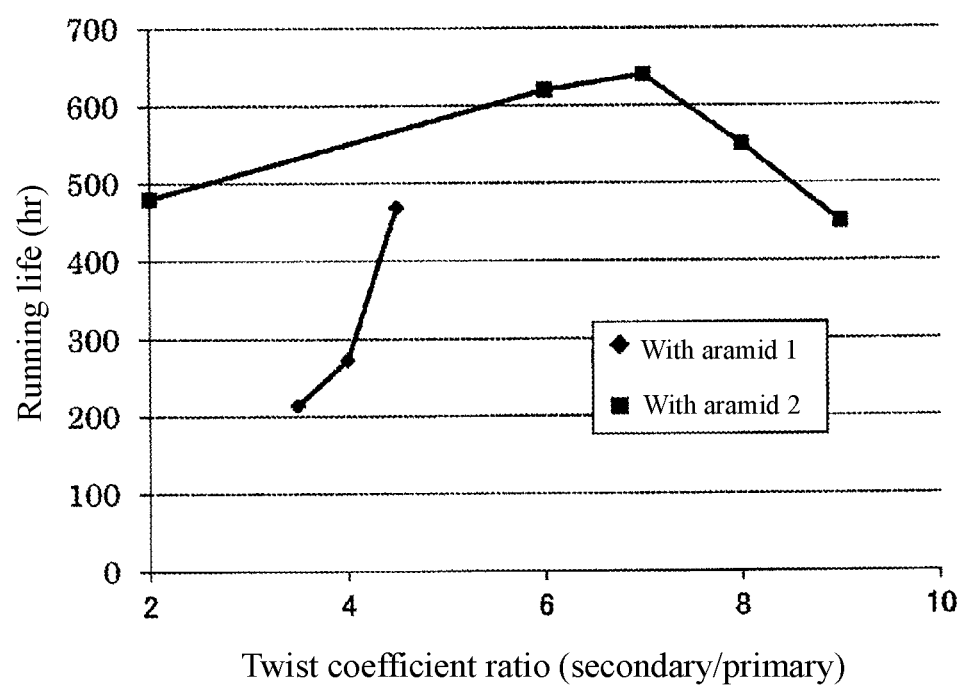
FIG. 4 is a graph showing relationships between the ratio of the secondary-twist coefficient to the primary-twist coefficient of aramid fibers and the running life of the V-ribbed belt, in Examples 1-6, 11, and 12.

With respect to modes of twisting, the Lang lay cords tended to bring about a longer running life than the plied cords. Among the Examples employing Lang lay cords, relationships between the ratio of the secondary-twist coefficient to the primary-twist coefficient of aramid fibers and the running life of the V-ribbed belt are shown in FIG. 4, for Examples 1-6, 11, and 12. As apparent from FIG. 4, in the case of using Lang lay cords, larger values of the ratio of the secondary-twist coefficient to the primary-twist coefficient of aramid fibers tend to result in a relatively long running life. That ratio in the range of about 4-8 (in particular, 5-7) was satisfactory. It can also be clearly seen that the Examples employing aramid 2 had longer running lives than the Examples employing aramid 1.

INDUSTRIAL APPLICABILITY

The V-ribbed belt of the present invention can be used as V-ribbed belts for accessory driving in automotive engines. However, since the V-ribbed belt not only can inhibit the core wires from suffering a disorder in pitch or being damaged during production by a mold-patterning method, but also is excellent in noiselessness and durability even when used in applications where high dynamic tension occur, the V-ribbed belt is especially suitable for use as V-ribbed belts for driving engines equipped with an ISG drive in which high dynamic tension occurs.

While the present invention has been described in detail and with reference to specific embodiments thereof, it is obvious to those skilled in the art that various changes and modifications can be made therein without departing from the spirit and scope thereof.

This application is based on a Japanese patent application No. 2017-120811 filed on Jun. 20, 2017 and a Japanese patent application No. 2018-112540 filed on Jun. 13, 2018, and the contents thereof is incorporated herein by reference.

REFERENCE SIGNS LIST

1 . . . Core wire
2 . . . Compression rubber layer
3 . . . V-rib part
4 . . . Adhesion rubber layer
5 . . . Tension layer

The invention claimed is:

1. A V-ribbed belt comprising a twisted cord that is obtained by mix-twisting: a high-elongation aramid fiber having an intermediate elongation under a load of 4 cN/dtex of 0.8% or higher and 3% or lower, and a tensile modulus of 50-100 GPa; and an aliphatic polyamide fiber having a lower tensile modulus than the high-elongation aramid fiber, and the V-ribbed belt having a tensile strength of 1.6 to 2.4 (kN/rib),
wherein the aliphatic polyamide fiber has a tensile modulus of 20 GPa or less, and
wherein the twisted cord is obtained by secondarily-twisting three untwisted yarns of the high-elongation aramid fiber or three primarily-twisted yarns of the high-elongation aramid fiber obtained by twisting the high-elongation aramid fiber in one direction; and one or a plurality of untwisted yarns of the aliphatic polyamide fiber or one or a plurality of primarily-twisted yarns of the aliphatic polyamide fiber obtained by twisting the aliphatic polyamide fiber in one direction, wherein the twisted cord is a Lang lay cord.

2. The V-ribbed belt according to claim 1, wherein the aliphatic polyamide fiber has a tensile modulus of 0.1 GPa or more.

3. The V-ribbed belt according to claim 1, wherein the twisted cord has a proportion of the high-elongation aramid fiber of 60-95% by mass.

4. The V-ribbed belt according to claim 1, wherein:
the twisted cord has a primary-twist coefficient of 0-6 and a secondary-twist coefficient of 2-6.

5. The V-ribbed belt according to claim 1, wherein the high-elongation aramid fiber has a ratio of a secondary-twist coefficient to a primary-twist coefficient of 4-8.

6. The V-ribbed belt according to claim 1, wherein the high-elongation aramid fiber has a ratio of a secondary-twist coefficient to a primary-twist coefficient of 5-7.

7. The V-ribbed belt according to claim 1, wherein the high-elongation aramid fiber has a primary-twist coefficient of 1 or less.

8. The V-ribbed belt according to claim 1, wherein the twisted cord is a plied cord and the high-elongation aramid fiber has a primary-twist coefficient of 2 or higher.

9. The V-ribbed belt according to claim 1, wherein at least a part of a frictional power-transmission surface is covered with a cloth.

10. The V-ribbed belt according to claim 1, which is mounted on an engine equipped with a belt type ISG drive.

11. A method for producing the V-ribbed belt according to claim 1, the method comprising a core wire preparation step of subjecting the twisted cord to a bonding treatment to prepare a core wire, wherein,
the method comprises, in the core wire preparation step, thermally stretching and fixing the twisted cord at a heat-set stretching ratio of 3% or less during a heat treatment of the bonding treatment.

* * * * *